United States Patent
Ito

(10) Patent No.: US 6,799,323 B2
(45) Date of Patent: Sep. 28, 2004

(54) ROTARY POSITIONING STAGE

(76) Inventor: Taisuke Ito, 1-9-7 Honfujisawa, Fujisawa, Kanagawa (JP), 251-0875

( * ) Notice: Subject to any disclaimer, the term of this patent is extended or adjusted under 35 U.S.C. 154(b) by 349 days.

(21) Appl. No.: 09/970,016

(22) Filed: Oct. 3, 2001

(65) Prior Publication Data
US 2002/0049104 A1 Apr. 25, 2002

(30) Foreign Application Priority Data
Oct. 20, 2000 (JP) .............................. 2000-320259

(51) Int. Cl.[7] .............................. G11B 5/56; G11B 21/24
(52) U.S. Cl. .................. 720/662; 360/264.6; 360/294.3
(58) Field of Search ................................ 369/244, 249; 360/264.3, 264.4, 264.5, 264.6–267, 294.1, 294.2, 294.3, 294.4; 73/1.01, 1.41, 865.8–865.9; 324/210, 212; 720/662, 659, 660, 661, 690

(56) References Cited

U.S. PATENT DOCUMENTS
4,513,332 A * 4/1985 Merritt et al. ............ 360/77.02

FOREIGN PATENT DOCUMENTS
| | | | | |
|---|---|---|---|---|
| EP | 286865 A1 | * | 10/1988 | ............ G11B/5/55 |
| JP | 60057577 A | * | 4/1985 | ............ G11B/21/04 |
| JP | 62075984 A | * | 4/1987 | ............ G11B/21/10 |
| JP | 63048671 A | * | 3/1988 | ............ G11B/21/10 |

OTHER PUBLICATIONS

"Piezoelectric Actuator for Small Hard Disk Drive," Feb. 1, 1993, IBM Technical Disclosure Bulletin, vol. No. 36, Iss. No. 2, pp. 379–380.*

* cited by examiner

Primary Examiner—William Klimowicz
(74) Attorney, Agent, or Firm—Pitney Hardin LLP

(57) ABSTRACT

A rotary positioning stage which enables a high speed and high precision positioning. The rotary positioning stage includes an arc-like portion 7a for forming an arc with respect to a rotation shaft 10, a rotary stage 2 on which a workpiece 5 can be mounted, a pulley 12 contacting the arc-like portion 7a, first positioning means 3 for positioning the workpiece 5 by rotating the rotary stage 2 via the pulley 12, second positioning means 4 for positioning the workpiece 5 by slightly moving the first positioning means 3 in a straight line-like manner in a tangent line direction at a contact point between the arc-like portion 7a and the pulley 12, wherein the straight line motion of the first positioning means 3 is converted into a rotational motion of the rotary stage 2 to position the workpiece 5.

17 Claims, 5 Drawing Sheets

ROTARY POSITIONING STAGE

BACKGROUND OF THE INVENTION

1. Field of the Invention

The present invention relates to a positioning device for an inspection device for inspecting a magnetic reading and writing head, a magnetic disc or the like, and more particularly to a rotary style positioning device.

2. Description of the Related Art

A hard disc device (HDD), which is an external memory device of a computer, has made a remarkable development in recent years. It is a recording and reproducing head that has contributed to such a remarkable development. A dynamic test (an R/W test=a Read after Write Test) used for the quality control is extremely important, and a precise drive device referred to as a spin stand is normally used in this R/W test. Since a structure close as much as possible to that of a HDD is desirable for the spin stand, the rotary style for positioning the head by the swing of the head is ideal.

However, there is a problem in that since the type that allows all the positioning with one actuator out of the conventional rotary positioning stages is controlled at a constant positioning resolution over all the strokes, the moving speed is slow even in the case where the stroke is long when the resolution is set to a high level. That is, even in the case where so precise positioning is not required (a rough motion), there is also a problem in that the motion speed is slow in the same manner as the case in which the stroke is short and a precise positioning is conducted.

On the other hand, the type having a double structure stage in which the stage is separated into a rough motion stage and a slight motion stage is intended to solve a function conforming to an object by providing a double structure of the precise motion and the rough motion and by using different actuators for respective movements in order to improve a disadvantage in that a motion speed is slow. However, the type having a double structure of stages, a rough motion stage and a slight motion stage becomes complicated in structure and the mechanical rigidity of the whole stage is lowered so that there arises a problem in that a settling time becomes long and a high speed and highly precise positioning cannot be conducted.

BRIEF SUMMARY OF THE INVENTION

The present invention has been made in view of the above problems, and an object of the present invention is to provide a rotary positioning stage that enables a high speed and a highly precise positioning.

In order to solve the above problems, after deliberate consideration, the inventors of the present invention take note of the fact that only extremely short stroke (e.g., 5 μm or less) is demanded in the test of the hard disc head, so that when the motion quantity is extremely small, the geometric error (an error of 0.5 μm or less with respect to the motion quantity of 5 μm) between a straight line motion and a rotational motion becomes so small that the error can be ignored, and have come to an idea that the actuator for the rotation of the rotary stage is moved in a direction of a straight line. Furthermore, when a speed reducing mechanism is used, a load inertia of the moving mass applied to the actuator via the speed reducing mechanism is theoretically square of the speed reducing ratio. Thus, the inventors of the present invention have come to the idea that a mechanical speed reducing mechanism is provided on the rotary positioning stage by taking note of the fact that the moving mass can be largely decreased.

A first aspect of the present invention is completed on the basis of the idea described above and provides a rotary positioning stage which comprises: a rotary stage rotatably supported on a rotation shaft and provided with an arc-like portion for forming an arc with respect to the rotation shaft, the stage allowing attachment of a work (e.g., workpiece); first positioning means provided with a pulley contacting the arc-like portion for positioning the work by rotating the rotary stage via the pulley; and second positioning means for positioning the work by slightly moving the first positioning means in a straight line-like manner in a tangent line direction at a contact point between the arc-like portion and the pulley.

A second aspect of the present invention provides a rotary positioning stage characterized in that the arc is formed in such a manner that the length from the rotation shaft to the art-like portion is formed in a range of 25 mm to 100 mm and the center angle is formed to 40 degrees or more, and the radius of the pulley is formed in a range of 5 mm to 20 mm while the second positioning means moves the first positioning means in a straight line-like manner within the range of 5 μm or less in addition to the structure according to the first aspect of the invention.

When the slight motion quantity of the first positioning means is in the range of 5 μm or less, the geometric error between the straight line motion and the rotational motion becomes so small that the error can be ignored. As a consequence, when the rotary stage is rotated in the range of 5 μm or less, the work can be positioned at a high precision by the second positioning means.

A third aspect of the present invention provides a rotary positioning stage characterized in that the stage is formed at a ratio between the length from the rotation shaft to the arc-like portion and the radius of the pulley ranging from a range of 1:1 to 10:1.

Here, the speed reducing ratio is set within the range of 1:1 to 10:1. Preferably, the ratio is set to 3:1 to 7:1, and most preferably, the ratio is set to 5:1.

A fourth aspect of the present invention provides a rotary positioning stage wherein the first positioning means is provided with a belt which is wound in an approximately crossing manner with respect to the arc-like portion and the pulley for rotating the rotary stage with the rotation of the pulley in such a manner that the rear surface runs along the external circumferential surface of the pulley and the surface runs along the external circumferential surface of the arc-like portion.

The first positioning means transmits the drive force generated from the drive source of a motor or the like to the arc-like portion of the rotary stage via a belt wound around the pulley and the arc-like portion. Since the belt is wound around the pulley and the arc-like portion in an approximately crossing manner, the pulley winds up the belt wound around the arc-like portion so that the rotary stage is rotated. That is, when the pulley is rotated, a part of the belt wound around the arc-like portion in advance is released to be wound by the pulley. Furthermore, a part of the belt wound around the pulley in advance is released to be wound by the arc-like portion. In this manner, the rotary stage is rotated by mutually winding up the belt between the pulley and the arc-like portion.

DETAILED DESCRIPTION OF THE INVENTION

Figure 1:
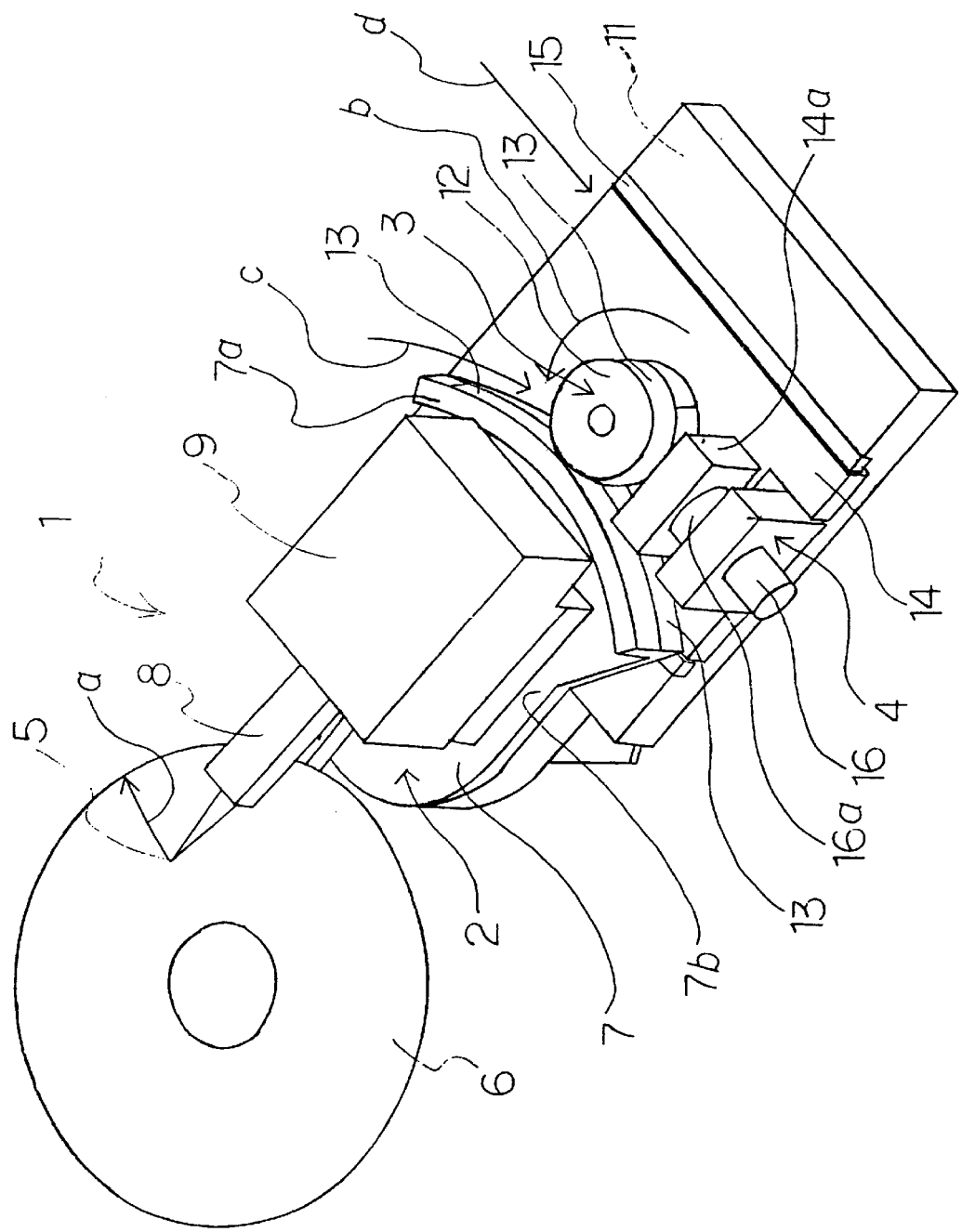
FIG. 1 is a view for schematically explaining a rotary positioning stage according to an embodiment of the present invention.

The following list of elements in the figures is provided.
1: rotary positioning stage
2: rotary stage
3: first positioning means
4: second positioning means
5: workpiece
7a: arc-like portion
10: rotation shaft
11: base plate
12: pulley
13: belt
14: micro stage
16: piezo-actuator
21: encoder sensor
26: encoder disc Embodiments of the present invention will be explained by referring to the drawings. As shown in FIG. 1, a rotary positioning stage 1 comprises a rotary stage 2, first positioning means 3, second positioning means 4, angle detection means 41 (see FIG. 2(b)), and a control portion (control means) (not shown) wherein the rotary stage 2 is rotated with the first positioning means 3 and the second positioning means 4 to position a work (e.g., workpiece) 5 on a predetermined position of a disc 6.

A segment drum 7 comprises an arc-like portion 7a as shown in FIG. 2(a) with the result that drive force is transmitted via a pulley 12 and a belt 13. The arc-like portion 7a is formed into an arc having an inner radius defined at a radius R1 from a center axis of the rotation shaft 10 and an outer radius defined at a radius R2 from the central axis of the rotation shaft 10 by a center angle α to have a height L from an upper surface 7b of the segment drum 7. The radii R1 and R2, and the height L are formed within the range of 25 mm to 100 mm. The center angle α is formed to 40 degrees or more. The arc length of an outer circumferential surface of the arc-like portion 7a is defined with the outer radius R2 and the center angle α, but is formed to a predetermined length in a relationship with the size of the disc 6, the length of the arm 8 and the like.

Note that the numerical values described herein, e.g., for dimensions, ratios and the like, are meant to be examples only. For example, the reference to a range of 25 mm to 100 mm should be understood to encompass a range of approximately 25 mm to approximately 100 mm. As another example, the reference to an angle of 40 degrees or more should be understood to encompass an angle of approximately 40 degrees or more.

On an upper surface 7b of the segment drum 7, a cartridge 9 is detachably attached for supporting the work 5 via the arm 8.

The rotation shaft 10 is inserted into a base plate 11 and is supported by bearings 23 and 24 as shown in FIG. 2(b). The rotation shaft 10 and the segment drum 7 are fixed with a bolt 25.

The first positioning means 3 has a pulley 12, a belt 13, and a micro stage 14 as shown in FIGS. 1, 2(a) and 2(b). The segment drum 7 is rotated centering on the rotation shaft 10 via the belt 13 with the rotation of the pulley 12 to position the work 5 to a predetermined position of the disc 6.

The micro stage 14 is formed in a plate-like configuration and is provided on the base plate 11 so as to slide along a guide way 15 provided on the base plate 11. On the upper surface of the micro stage 14, there are provided a connection portion 14 connected to a movable portion 16a of a piezo-actuator 16 for sliding the micro stage 14, and a connection portion 14b connected to the disc spring 20 for bringing back the micro stage 14 to the original position.

The pulley 12 is arranged on an upper surface of the micro stage 14 so that the outer circumferential surface of the pulley 12 comes into contact with the outer circumferential surface of the arc-like portion of the segment drum 7 via the belt 13. An ultrasonic motor 17 mounted on the micro stage 14 is connected to the pulley 12.

Here, there will be explained a speed reducing mechanism constituted of the arc-like portion 7a and the pulley 12. A ratio of the radius R2 (the length from the rotation shaft 10 to the arc-like portion 7a) of the arc-like portion 7a and the radius of the pulley 12 represents a speed reducing ratio. Thus, when the radius R2 of the arc-like portion 7a is larger than the radius of the pulley 12, a speed reducing mechanism is constituted with the arc-like portion 7a and the pulley 12. The speed reducing ratio is set to a range of 1:1 to 10:1. Preferably, the ratio is set to a range of 3:1 to 7:1, and most preferably the ratio is set to 5:1. In the case where the arc-like portion 7a and the pulley constitute a speed reducing mechanism, a load inertia of the moving mass applied to the pulley 12 is square of the speed reducing ratio. In the case of the speed reducing ratio of 5:1, the load inertia of the moving mass becomes one twenty fifth. The moving mass applied to the pulley 12 can be largely decreased by adjusting the speed reducing ratio to form the arc-like portion 7a and the pulley 12.

The radius R2 of the arc-like portion 7a is formed in the range of 25 mm to 100 mm. Then, when the radius of the pulley 12 is formed in the range of 5 mm to 20 mm, the speed reducing mechanism can be constituted so that the speed reducing ratio is set to the range of 1:1 to 10:1.

It is so constituted that a belt 13 is wound around the pulley 12 and the arc-like portion 7a so that a drive force of the ultrasonic motor 17 is transmitted to the arc-like portion 7a via the belt 13 by the rotation of the pulley 12.

Figure 3:
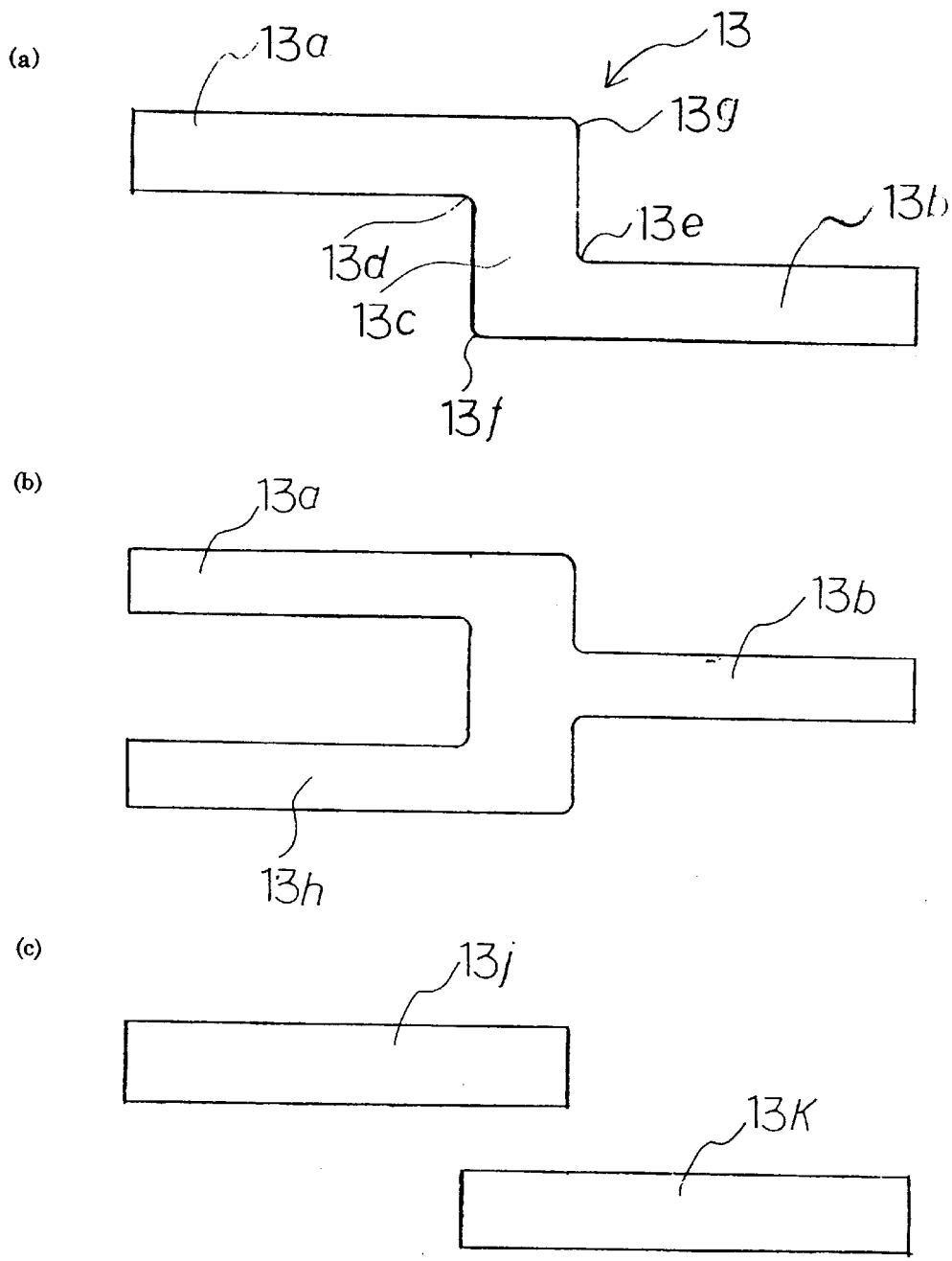
FIGS. 3(a)–(c) are views for explaining a form of a belt in accordance with the present invention.

As shown in FIG. 3(a), the belt 13 has a first belt-like portion 13a, a second belt-like portion 13b, and a fixing space 13c which are integrally made of stainless steel. When the belt 13 is wound around the pulley 12 and the arc-like portion 7a, the first belt-like portion 13a and the second belt-like portion 13b are mutually arranged on a diagonal line of the fixing space 13c so as not to mutually overlap in the contact point of the pulley 12 and the arc-like portion 7a. Furthermore, the notched portions 13d and 13e and the end portions 13f and 13g of the fixing space 13c are formed with an R portion by cutting off an angle. Thus, the strength of the belt 13 can be improved by cutting the angle for preventing the cracks from being generated on the belt 13.

This belt 13 is wound around the arc-like portion 7a and the pulley 12 in an approximately crossing manner so that the rear surface (the rear side of the paper of FIG. 3(a)) of the belt 13 runs along the outer circumferential surface of the pulley 12 while the surface (the surface side of the paper of FIG. 3(a)) of belt 13 runs along the outer circumferential surface of the arc-like portion 7a. That is, the belt 13 is wound around the outer circumferential surfaces of the pulley 12 and the arc-like portion 7a so that the first belt-like portion 13a and the second belt-like portion 13b are located opposite to each other (displaced from each other) at a contact point of the pulley 12 and the arc-like portion 7a.

As shown in FIG. 2(a), the fixing space 13c and the pulley 12 are fixed with a belt 18 while the end portion of the first belt-like portion 13a and the second belt-like portion 13b in the longitudinal direction and the end portion of the arc-like portion 7a are fixed with the fixing member 19.

In this manner, the belt 13 is wound around the arc-like portion 7a and the pulley 12 in an approximately crossing manner so that the segment drum 7 is rotated centering around the rotation shaft 10 by the rotation of the pulley 12 while the belt 13 is fixed to the arc-like portion 7a and the pulley 12.

The second positioning means 4 has the piezo-actuator 16, a base plate 11 and a disc spring 20. With a slight motion of the micro stage 14 in a straight line-like manner, the segment drum 7 is extremely slightly rotated to position the work 5 on the disc 6 at a high precision. Incidentally, in FIG. 1, the connection portion 14b, the disc spring 20 and a support body 20a are omitted.

As shown in FIG. 2(b), the base plate 11 is formed on an upper surface to support the segment drum 7 and the micro stage 14 and is formed on a lower surface to support an encoder sensor 21 and an encoder block support plate 22.

The base plate 11 is provided with the guide way 15 so that the micro stage 14 can be slided as shown in FIG. 2(a). This guide way 15 is provided with the micro stage 14 in a width direction of the base plate 11 so as to slide in a tangent line direction at a contact point of the arc-like portion 7a and the pulley 12.

The piezo-actuator 16 is provided on an upper surface of the base plate 11 so as to slightly move the micro stage 14. The piezo-actuator 16 is constituted such that the movable portion 16a is fixed to the connection portion 14a provided on the micro stage 14, and the micro stage 14 is slightly moved in a straight line-like manner via a connection portion 14a by moving the movable portion 16a in a forward and a backward direction.

The support body 20a of the disc spring 20 is arranged at a position opposite to the piezo-actuator 16 on an upper surface of the base plate 11 as shown in FIG. 2(a). The disc spring 20 is connected to a connection portion 14b provided on the support body 20a and the micro stage 14, so that the micro stage 14 is brought back to the original position with a repulsion force of the spring.

When the slight motion quantity of the micro stage 14 by the piezo-actuator 16 is 5 $\mu$m or less, the geometric error between the straight line motion of the micro stage 14 and the rotational motion of the segment drum 7 becomes 0.5 nm or less, and becomes one thousandth or less with respect to the slight motion quantity so that the quantity is so small that the quantity can be ignored. Consequently, the straight line motion of the micro stage 14 by the piezo-actuator 16 is converted into the rotational motion of the segment drum 7 via the pulley 12, the belt 13 and the arc-like portion 7a.

In this manner, the second positioning means 4 slightly moves the micro stage 14 in a straight line-like manner in a tangent line direction at a contact point between the arc-like portion 7a and the pulley 12 to rotate the segment drum 7 extremely slightly to position the work 5 on the disc 6 at a high precision.

The angle detection means 41 has an encoder block support plate 22, an encoder block 27, an encoder disc 26 and an encoder sensor 21 to detect the rotation angle of the rotary stage.

The encoder block support plate 22 is fixed to the lower surface of the rotation shaft 10 with the bolt 25. In this manner, the encoder block support plate 22 is fixed on the lower surface of the rotation shaft 10 and the segment drum 7 is fixed on the upper surface of the rotation shaft 10. Thus, when the segment drum 7 is rotated, the rotation quantity thereof is transmitted to the encoder block support plate 22 via the rotation shaft 10 so that the encoder block support plate 22 is rotated by the same rotation quantity as the rotation quantity of the segment drum 7.

An encoder block 27 is provided for supporting an encoder disc 26 on the encoder block support plate 22. The encoder block support plate 22, the encoder block 27 and the encoder disc 26 are integrally rotated with the rotation of the encoder block support plate 22.

The encoder sensor 21 is provided on the lower surface of the base plate 11 so as to detect the rotation angle of the encoder disc. The encoder sensor 21 is connected to a control portion (not shown) to output the detected rotation angle.

The control portion compares the rotation angle output from the encoder sensor 21 and a target angle (a target value) which is set in advance to control an ultrasonic motor 17 and a piezo-actuator 16 on the basis of the deviation thereof.

On the basis of the above structure, an operation of the rotary positioning stage 1 will be explained by referring to FIGS. 1 and 2.

The first positioning means 3 transmits the drive force of the ultrasonic motor 17 to the arc-like portion 7a of the segment drum 7 via the pulley 12 and the belt 13. Since the belt 13 is wound around the pulley 12 and the arc-like portion 7a in an approximately crossing manner, the pulley 12 rotates the rotary stage 2 by winding up the belt 13 wound around the arc-like portion 7a to position the work 5 on a predetermined position on the disc 6 at a high speed.

The second positioning means 4 slightly moves the micro stage 14 in a straight line-like manner in a tangent line direction at a contact point of the arc-like portion 7a and the pulley 12 via the movable portion 16a and the connection portion 14a with the piezo-actuator 16. Since the pulley 12 is provided on the micro stage 14, the segment drum 7 is extremely slightly moved via the pulley 12, the belt 13 and the arc-like portion 7a when the micro stage 14 is slightly moved in a straight line-like manner in a tangent line direction by the piezo-actuator 16. In this manner, the second positioning means 4 converts the straight line motion of the micro stage 14 by the piezo-actuator 16 into a rotational motion of the segment drum 7 via the pulley 12, the belt 13 and the arc-like portion 7a provided on the micro stage 14. Thus, the rotary stage 2 is extremely slightly moved to position the work 5 on the disc 6 at a high precision.

Next, the operation of the rotary positioning stage 1 will be explained with respect to a case in which the position of the work 5 shown in FIG. 1 is moved in a direction of a diameter (a direction of an arrow a) to be positioned at a predetermined position at a high speed and at a high precision.

As shown in FIG. 1, when the pulley 12 is rotated in a direction of b (a counterclockwise direction), a part of the first belt-like portion 13a wound around the arc-like portion 7a is wound by the pulley 12. Furthermore, a part of the second belt-like portion 13b wound around the pulley 12 in advance is released to be wound by the arc-like portion 7a. The end portions of the first belt-like portion 13a and the second belt-like portion 13b are fixed to the end portion of the arc-like portion 7a. Thus, when a part of the first belt-like portion 7a is wound by the pulley 12, the arc-like portion 7a is pulled by the first belt-like portion 13a. Then, the segment drum 7 is rotated in a direction of an arrow c (a clockwise direction) centering on the rotation shaft 10. When the pulley 12 is rotated in a direction of an arrow b, the segment drum 7 is rotated in a direction of c via the belt 13 and the arc-like portion 7a. Consequently, the work 5 is moved in a direction of an arrow a on the desk 6 to be positioned at a predetermined position at a high speed.

Next, the movable portion 16a of the piezo-actuator 16 is retreated in a direction of an arrow d, and the micro stage 14 is slightly moved by 5 μm in a straight line-like manner via the connection portion 14a. Since the micro stage 14 is provided with an ultrasonic motor 17 to which the pulley 12 is connected, when the micro stage 14 is slightly moved in a straight line-like manner by 5 μm in a direction of an arrow d, the pulley 12 is also slightly moved in a straight line-like manner by 5 μm in a direction of an arrow d (a tangent line direction at a contact point between the arc-like portion 7a and the pulley 12).

In this manner, the slight motion of the pulley 12 by 5 μm in a direction of an arrow d means a rotation of the pulley 12 in a direction of an arrow d by an extremely slight quantity. That is, when the pulley 12 on which the belt 13 is wound is slightly moved by 5 μm in a direction of an arrow b, the arc-like portion 7a is pulled by the first belt-like portion 13a so that the segment drum 7 is rotated in a direction of an arrow c by an extremely slight quantity.

When the pulley 12 is slightly moved in a straight line-like manner in a direction of an arrow d, the segment drum 7 is rotated in a direction of an arrow c via the arc-like portion 7a. Thus, the work 5 is slightly moved in a direction of an arrow a. That is, when the micro stage 14 mounted with the pulley 12 is slightly moved in a straight line-like manner by 5 μm in a direction of an arrow d, the straight line motion by an extremely small quantity can be converted into the rotational motion by an extremely small quantity. Thus, the work 5 is slightly moved on the disc 6 in a direction of an arrow a to be positioned on a predetermined position at a high precise.

Incidentally, the reason why the straight line motion by an extremely slight quantity can be converted into the rotational motion by an extremely slight quantity is that when the slight motion quantity of the micro stage 14 mounted with the pulley 12 in a straight line direction is in the range of 5 μm or less, a geometric error between the straight line motion of the micro stage 14 and the rotational motion of the segment drum 7 becomes 0.5 nm or less so that the error becomes so small that it can be ignored.

As has been explained above, the rotary positioning stage 1 rotates the segment drum 7 at a high speed via the pulley 12, the belt 13 and the arc-like portion 7a by using the ultrasonic motor 17 having a low resolution to position the work 5 at a predetermined position at a high speed. Next, the segment drum 7 is rotated by an extremely slight quantity via the pulley 12, the belt 13 and the arc-like portion 7a by using the piezo-actuator 16 having a high resolution to position the work 5 at a predetermined position at a high precision. In this manner, the rotary positioning stage 1 according to this embodiment has a structure in which an actuator having a low resolution and an actuator having a high resolution can be used according to the purpose. Thus, the work 5 can be positioned at a predetermined position on a disc 6 at a high speed and at a high precision.

The rotary positioning stage 1 according to this embodiment can be effectively used with respect to the device and the equipment which require a precise positioning, such as a spin stand, a hard disc drive, an optical disc, a semiconductor, an electron microscope or the like.

It has been explained that in this embodiment, the radii R1 and R2 and the height L of the arc-like portion 7a are formed in the range of 25 nm to 100 nm, the center angle α is formed to be 40 degrees or more. However the size of the arc-like portion is not limited to the above size. Furthermore, although it is has been explained that the radii of the pulley 12 are formed in the range of 5 mm to 20 mm, but the size of the pulley 12 is not limited to the above size.

It has been explained that in this embodiment the segment drum 7 constituting the rotary stage 2 has an arc-like portion 7a having an inner radius defined at a radius R1 from the central axis of the rotation shaft 10 and an outer radius defined at a radius R2 from the central axis of the rotation shaft 10 and defined by the center angle α. However, since the rotary stage 2 may only be provided with at least a portion which is formed in an arc-like configuration with the result that, for example, the segment drum 7 may be formed in a disc-like configuration having a predetermined thickness.

It has been explained that in this embodiment the belt 13 has the first belt-like portion 13a, the second belt-like portion 13b and the fixing space 13c which are integrally made stainless steel as shown in FIG. 3(a). However, the configuration and the material quality of the belt 13 are not limited thereto. Consequently, as shown in FIG. 3(b), the belt 13 may have the first belt-like portion 13a, the second belt-like portion 13b, a third belt-like portion 13h and the fixing space 13c which are integrally formed. In this case, the belt 13 shown in FIG. 3(b) is formed in such a manner that when the belt 13 is wound around the pulley 12 and the arc-like portion 7a in an approximately crossing manner, the first belt-like portion 13a, the second belt-like portion 13b and the third belt-like portion 13h do not overlap each other at the contact point of the pulley 12 and the arc-like portion 7a.

Furthermore, the number of the belt 13 is not limited to one. Two belts may be employed as shown in FIG. 3(c). In this case, one belt is wound around the arc-like portion 7a and the pulley 12 in such a manner that the rear surface of a first belt 13j runs along an outer circumferential surface of the pulley 12 while the surface of the first belt 13j runs along an outer circumferential surface of the arc-like portion 7a, and the other belt is wound around the arc-like portion 7a and the pulley 12 in such a manner that rear surface of a second belt 13k runs along an outer circumferential surface of the pulley 12 while the surface of the second belt 13k runs along an outer circumferential surface of the arc-like portion 7a. That is, the first belt 13j and the second belt 13k are wound around the outer circumferential surface of the pulley 12 and the arc-like portion 7a in such a manner that the first belt 13j and the second belt 13k are located opposite to each other (displaced from each other) at the contact point.

It has been explained that in a method for winding the belt 13, an outer circumferential surfaces of the pulley 12 and the arc-like portion 7a which come into contact to each other constitute a part of a crossing configuration so that an expression, "approximately crossing manner" is used. The expression "approximately crossing manner" means, e.g., that the first belt-like portion 13a and the second belt-like portion 13b are wound around the outer circumferential surfaces or a part of the outer circumferential surfaces of the pulley 12 and the arc-like portion 7a in such a manner that the first belt-like portion 13a and the second belt-like portion 13b are located opposite to each other (displaced from each other) at a contact point of the pulley 12 and the arc-like portion 7a. Consequently, although the arc-like portion 7a is formed on a part of the segment drum 7 according to this embodiment, the outer circumferential surfaces of the pulley 12 and the arc-like portion 7a of the segment drum 7 constitute a crossing configuration in the case where the segment drum 7 has a disc-like configuration. Thus, the concept of the approximately crossing configuration includes a case in which the belt is wound around the outer circumferential surfaces of the pulley 12 and the arc-like portion 7a in a crossing manner.

It has been explained that in this embodiment, the first positioning means 3 has a mechanism of transmitting a drive force to the arc-like portion 7a via the belt 13. However, the first positioning means 3 of the rotary positioning stage 1 according to the present invention is not limited thereto. Consequently, the mechanism may be constituted such that the drive force is transmitted directly from the pulley 12 to the arc-like portion 7a by making use of friction force of the pulley 12 and the arc-like portion 7a not via the belt 13. In this case, the height L of the arc-like portion 7a is formed in a length which allows to secure a contact surface with the pulley 12.

Furthermore, the first positioning means 3 may have a structure in which a first pulley contacting an arc-like portion 7a and a second pulley contacting the first pulley are provided like a piano square not via the belt 13, and the segment drum 7 is rotated via the first pulley by rotating the second pulley.

It has been explained that in this embodiment, since the ultrasonic motor 17 is provided on the micro stage 14, the ultrasonic motor 17 is also slightly moved along with the slight motion of the micro stage 14. Since the first positioning means 3 of the rotary positioning stage 1 according to the present invention does not have a concept including the ultrasonic motor 17, the first positioning means 3 is not necessarily limited to a structure in which the ultrasonic motor 17 is provided on the micro stage 14. Consequently, the second positioning means 4 does not necessarily need to slightly move the ultrasonic motor 17 and may only have a structure in which the pulley 12 contacting the arc-like portion 7a is slightly moved.

It has been explained that in this embodiment, the ultrasonic motor 17 having a low resolution is connected to the pulley 12 while the piezo-actuator 16 having a high resolution is used for the slight motion of the micro stage 14. However, the motor connected to the pulley 12 is not limited to the ultrasonic motor 17. Furthermore, the actuator slightly moving the micro stage 14 is not limited to the piezo-actuator 16. Consequently, a linear motor may be used in place of the piezo-actuator 16.

Figure 2:
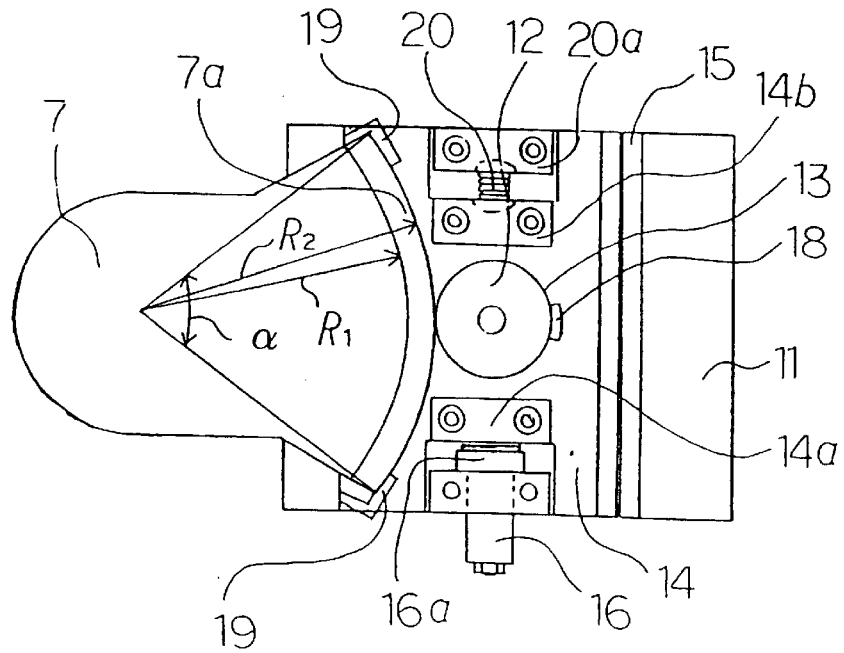
FIGS. 2(a) and 2(b) are views for explaining the rotary positioning stage according to an embodiment of the present invention.
Figure 2:
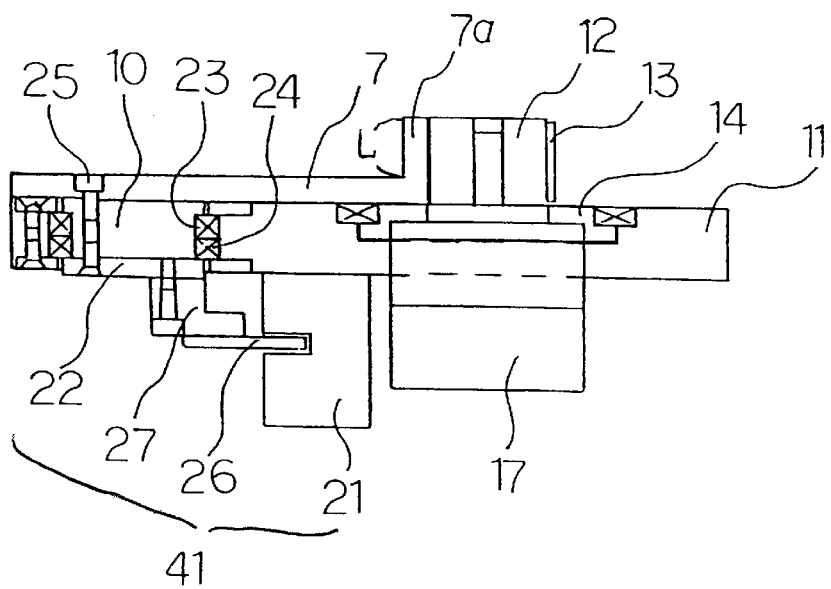

Next, there will be explained as an embodiment a case in which the rotary positioning stage 1 explained in FIGS. 1 and 2 is used in the spin stand. Incidentally, with respect to the rotary positioning stage 1, the segment drum 7 and the pulley 12 are constituted in the following manner.

An outer radius R2 of the arc-like portion 7a is set to 60 mm.

A center angle α is set to 40 degrees.

A radius of the pulley 12 is set to 12 mm.

Figure 4:
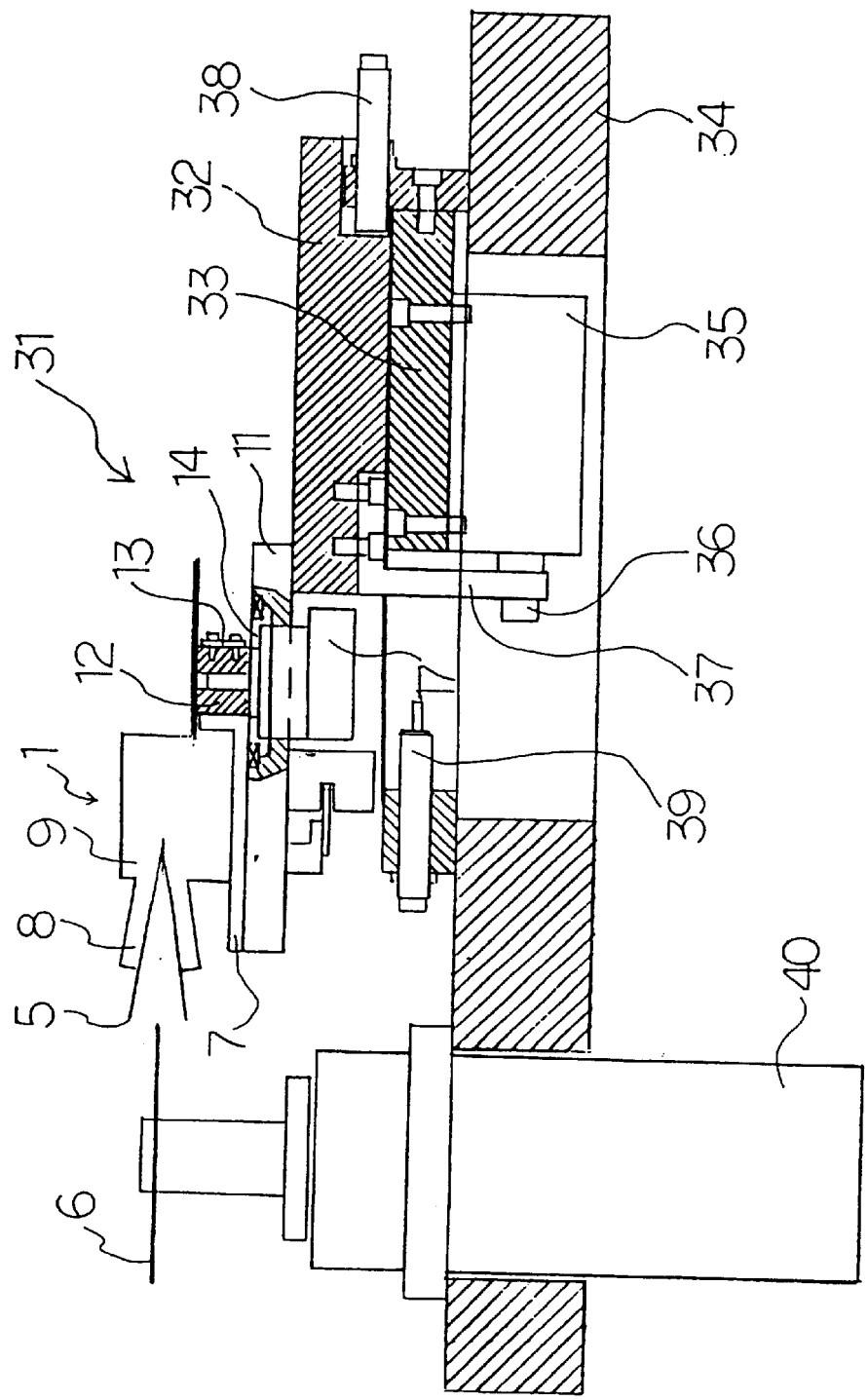
FIG. 4 is a view for explaining a spin stand in accordance with the present invention.
Figure 5:
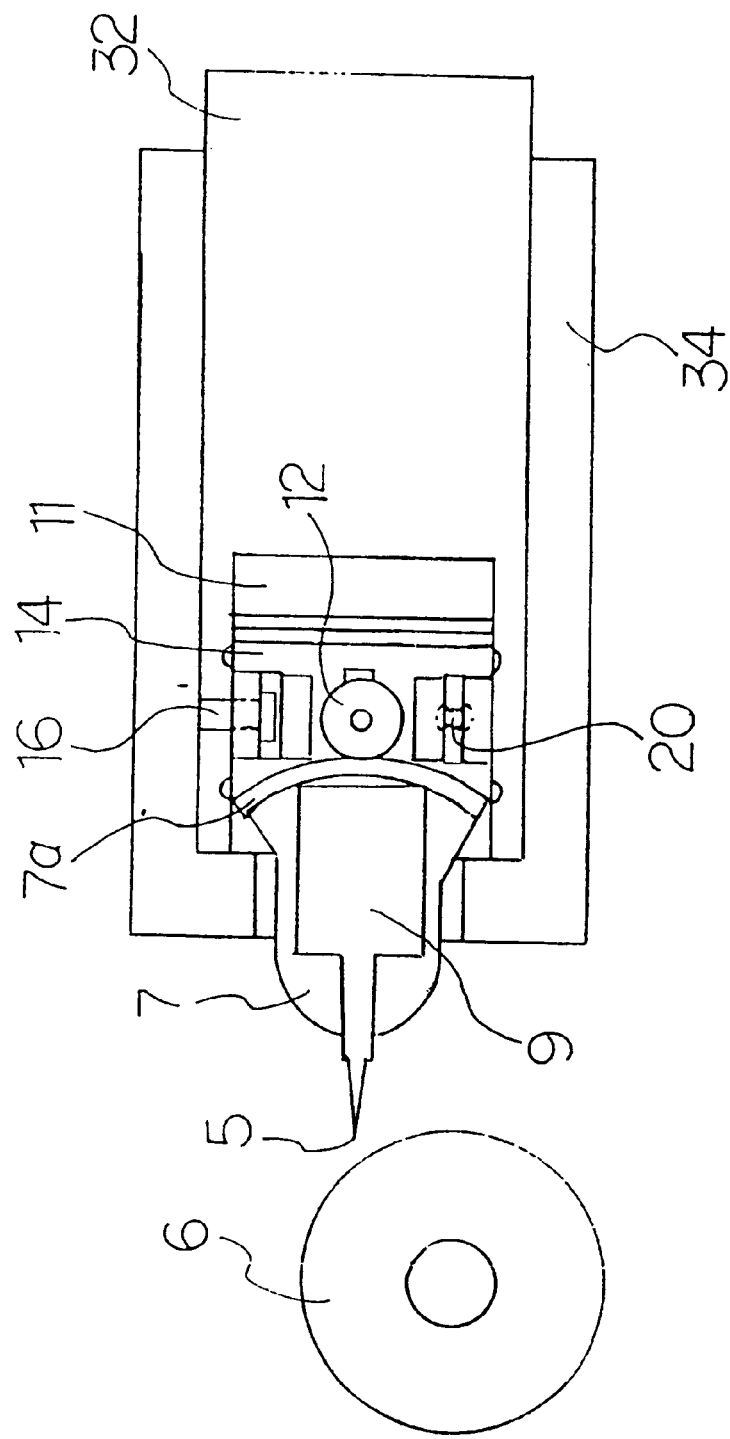
FIG. 5 is a view for explaining a spin stand in accordance with the present invention.

The spin stand 31 is a drive device for conducting an R/W test for inspecting the characteristic of the work 5, for example, a configuration or the like of the work 5. As shown in FIGS. 4 and 5, the drive device has a carrier stage 32 for moving the rotary positioning stage 1, a spindle 40 for supporting the disc 6 to position the work 5 with respect to the disc 6.

A base plate 11 is provided on the upper surface of the carrier stage 32. The carrier stage 32 slides on a cylinder support plate 33 to move the rotary positioning stage 1 in a direction of the disc 6.

The cylinder support plate 33 is fixed on an upper surface of the base 34 and a cylinder 35 accommodated in the base 34 is fixed on the lower surface of the cylinder support plate 33. The piston 36 extending from this cylinder 35 and the carrier stage 32 are connected with a connection member 37. Furthermore, an encoder sensor 38 for detecting the motion quantity of the carrier stage 32 and a stopper 39 for stopping the sliding of the carrier stage 32 are provided on the cylinder support plate 33.

The spindle 40 is supported on the base 34 to rotatably support the disc 6.

Next, an operation of the spindle stand 31 will be explained on the basis of the above structure. The spindle stand 31 slides the carrier stage 32 in a direction of the disc 6 by extending the piston 36. The carrier stage 32 is moved to a predetermined position to position the work 5 to a predetermined position on the disc 6. Next, the rotary positioning stage 1 rotates the rotary stage 2 to position the work 5 to a predetermined position on the disc 6 at a high speed and at a high precision. Thereafter, the work 5 is measured at the predetermined position. When the measurement is conducted, the rotary positioning stage 1 moves the work 5 again to the next measurement point to position the work 5 at the position. In this manner, the work 5 is subsequently positioned and measured at a plurality of measurement points on the disc 6.

Furthermore, the present invention can be applied at the time of manufacturing a work. At the time of manufacturing a work (the manufacture includes an inspection step of the quality of the work), an extremely minute positioning is required in some cases. For example, it is the case of inspecting the electromagnetic conversion characteristic of the magnetic head. In the inspection of the electromagnetic conversion characteristic of the magnetic head, an inspection result most close to the reality can be obtained in the case where the inspection is conducted by actually operating the magnetic head on the hard disc.

As a result of higher density of magnetic recording in recent years, the precision for the positioning by the magnetic head on the hard disc in actuality attains an order of molecule level from 1 nm to 5 nm.

Then, at the time of positioning on the hard disc, a method for manufacturing a work may be used which comprises:

a step of mounting a work on a rotary stage rotatably supported on a rotation shaft and provided with an arc-like portion for forming an arc with respect to the rotation shaft;

a first positioning step of positioning the work by rotating the rotary stage via a pulley contacting the arc-like portion;

a second positioning step for positioning the work by slightly moving the pulley in a tangent line direction at the contact point;

a characteristic evaluation step for evaluating the characteristic of the work at a position defined at the first positioning step and the second positioning step; and a processing step for processing the work in accordance with the evaluation result of the characteristic evaluation step.

It goes without saying that there are considered as the work an optomagnetic head, various kinds of sensors, and a precision device which requires minutes processing in addition to the magnetic head. When this manufacturing method is utilized, the three-dimensional minute processing of the integrated circuit of the semiconductor device can be also conducted. Furthermore, the method can be applied to the photolithographic processing at the time of manufacturing the semiconductor device. For example, the method can be applied for processing a mask, and the positioning the mask.

As other example of the work, an electromagnetic conversion element, an optomagnetic head, a lens for a compact disc and a digital versatile or video disk (DVD) can be employed in addition to the magnetic head.

Furthermore, the processing at the manufacturing step may be a performance classification such as a magnetic head, or may be machining, polishing or other physical and chemical processings. Furthermore, the processing may be used in an arm for an operation conducted under a microscope which is used at the time of artificial fertilization.

Furthermore, the processing can be used for the inspection of a hard disc. For example, this is a case in which an inspection is conducted as to whether or not a servo track is written at a high precision, whether or not a reproduction capability is not deteriorated due to a minute variation in tracks.

In addition, this positioning can be used for a hard disc drive, a optomagnetic disc itself or the like. That is, the present invention is useful for track positioning of a magnetic head, an optomagnetic head or the like in these drive devices.

Furthermore, the present invention can be applied to various kinds of inspection devices which require a minute positioning. For example, the invention can be applied to the positioning of a probe of an operation type tunnel effect microscope. A recording and reproducing device can be realized which has an extremely high recording density and a high access speed by applying the invention to the recording and reproducing device.

Incidentally, the minute positioning is enabled in a method in which the first positioning step is conducted with a belt which is wound around the arc-like portion and the pulley in an approximately crossing manner in such a manner that the rear surface of the belt runs along the outer circumferential surface of the pulley while the surface of the belt runs along the outer circumferential surface of the arc-like portion and the rotary stage is rotated by the rotation of the pulley. The method is also excellent in that the belt is minutely deformed by stress and an extremely minute geometric error is absorbed.

That is because when the pulley is rotated in a tangent line direction, the pulley and the rotary stage do not contact with each other. Consequently, suppose that the belt is rigid, the pulley cannot be moved in the direction. However, in actuality, the belt is slightly deformed by stress and the pulley can be moved in the direction. That is, the belt is slightly moved by stress so that the contact of the pulley and the rotary stage via the belt can be secured. From this point of view, a material having a small hysteresis by stress is appropriate as a material of the belt.

Furthermore, the positioning method can be used for positioning the electromagnetic conversion element to the recording medium. Furthermore, the positioning method can be used for the hard disc drive. The method can be also applied to the optomagnetic head of the optomagnetic recording.

Since the invention according to the first and the second aspects of the present invention has a strong mechanical rigidity as compared with the conventional rotary positioning stage, a mechanical vibration generated in the rotary positioning stage is soon converged. As a consequence, there arises an advantage in that the settling time is shortened, and the work mounted on the rotary stage can be positioned at a high speed. Furthermore, since the first positioning means and the second positioning means are operated by different actuators, an actuator having a high resolution can be used for the second positioning means. As a consequence, there arises an advantage in that the work mounted on the rotary stage can be positioned at a high speed and at a high precision.

Aspects of the invention other than the aspects that can be grasped from the embodiments will be described together with the advantage thereof.

The rotary positioning stage according to any of first to fourth aspects is a rotary positioning stage which comprises angle detection means for detecting a rotation angle of the rotary stage, and control means for controlling a drive source of the first positioning means and/or the second positioning means on the basis of a deviation between the rotation angle and the target value.

Since the control means controls the drive source of the first positioning means and/or the second positioning means on the basis of the deviation between the rotation angle detected with the angle detection means and the target value, there arises an advantage in that a feedback control is enabled and more higher speed and higher precision positioning can be enabled in addition to the advantage of the invention according to any of first to fourth aspects.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A rotary positioning stage, comprising:

a rotary stage rotatably supported on a rotation shaft and provided with an arc-like portion for forming an arc with respect to the rotation shaft, the stage allowing to mount a workpiece;

first positioning means provided with a pulley contacting the arc-like portion for positioning the workpiece by rotating the rotary stage via the pulley; and second positioning means for positioning the workpiece by slightly moving the first positioning means in a straight line-like manner in a tangent line direction at a contact point between the art-like portion and the pulley.

2. The rotary positioning stage according to claim 1, wherein:

the arc is formed to have a length in the range from approximately 25 mm to approximately 100 mm from the rotation shaft to the arc-like portion, and a center angle of approximately 40 degrees or more, and the radius of the pulley is formed to a range of approximately 5 mm to approximately 20 mm while the second positioning means moves the first positioning means in a straight line-like manner in a range of approximately 5 $\mu$m or less.

3. The rotary positioning stage according to claim 1 or 2, wherein:

the stage is formed at a ratio of the length from the rotation shaft to the arc-like portion and the radius of the pulley in the range of approximately 1:1 to approximately 10:1.

4. The rotary positioning stage according to claim 1 or 2, wherein:
the first positioning means is provided with a belt which is wound around the arc-like portion and the pulley in an approximately crossing manner in a such a manner that a rear surface of the belt runs along an outer circumferential surface of the pulley while a surface of the belt runs along the circumferential surface of the arc-like portion and the belt rotates the rotary stage with the rotation of the pulley.

5. A method for manufacturing a workpiece, comprising:
a step of mounting a workpiece on a rotary stage rotatably supported on a rotation shaft and provided with an arc-like portion for forming an arc with respect to the rotation shaft;
a first positioning step of positioning the workpiece by rotating the rotary stage via a pulley contacting the arc-like portion;
a second positioning step for positioning the workpiece by slightly moving the pulley in a tangent line direction at the contact point;
a characteristic evaluation step for evaluating the characteristic of the workpiece at a position defined at the first positioning step and the second positioning step; and
a processing step for processing the workpiece in accordance with the evaluation result of the characteristic evaluation step.

6. The method for manufacturing a workpiece according to claim 5, wherein:
the workpiece is an electromagnetic conversion element.

7. The method for manufacturing a workpiece according to claim 5, wherein;
the workpiece is a magnetic head for a hard disk drive, and
the positioning is a positioning with respect to the magnetic recording and reproducing hard disc.

8. The method for manufacturing a workpiece according to claim 5, wherein:
the workpiece is a magnetic head for a hard disc drive,
the positioning is a positioning with respect to the magnetic recording and reproducing hard disc,
the evaluation is an evaluation of the electromagnetic conversion characteristic, and
the processing step is a performance classification of a magnetic head in accordance with an evaluation result.

9. The method for manufacturing a workpiece according to claim 5, wherein:
the first positioning step is conducted with a belt which is wound around the arc-like portion and the pulley in an approximately crossing manner in such a manner that the rear surface of the belt runs along an outer circumferential surface of the pulley while the surface of the belt is wound around an outer circumferential surface of the arc-like portion and which rotates the rotary stage with the rotation of the pulley.

10. A method for manufacturing a hard disc, comprising:
a step of mounting a magnetic head on a rotary stage rotatably supported on a rotation shaft and provided with an arc-like portion for forming an arc with respect to the rotation shaft;
a first positioning step of positioning the magnetic head at the hard disc by rotating the rotary stage via a pulley contacting the arc-like portion;
a second positioning step for positioning the magnetic head at the hard disc by slightly moving the pulley in a tangent line direction at the contact point;
a characteristic evaluation step for evaluating the characteristic of the hard disc at a position of a magnetic head defined at the first positioning step and the second positioning step; and
a processing step for processing the hard disc in accordance with the evaluation result of the characteristic evaluation step.

11. The method for manufacturing a hard disc according to claim 10, wherein:
the processing is a performance classification of a hard disc.

12. The method of manufacturing a hard disc according to claim 10, wherein;
The first positioning step is conducted with a belt which is wound around the arc-like portion and the pulley in an approximately crossing manner in such a manner that the rear surface of the belt runs along an outer circumferential surface of the pulley while the surface of the belt runs along an outer circumferential surface of the arc-like portion and which rotates the rotary stage with the rotation of the pulley.

13. A method for positioning with respect to a recording medium an electromagnetic conversion element mounted on a rotary stage rotatably supported on a rotation shaft and provided with an arc-like portion for forming an arc with respect to the rotation shaft, the method comprising;
a first positioning step of positioning a workpiece by rotating the rotary stage via a pulley contacting the arc-like portion; and
a second positioning step of positioning the workpiece by slightly moving the pulley in a tangent line direction at a contact point.

14. The method for positioning an electromagnetic conversion element according to claim 13, wherein:
the first positioning step is a step of rotating the rotary stage by the rotation of the pulley with a belt wound around the arc-like portion and the pulley in an approximately crossing manner in such a manner that the rear surface of the belt runs along the outer circumferential surface of the pulley while the surface of the belt runs along the outer circumferential surface of the arc-like portion.

15. A magnetic recording and reproducing hard disc drive apparatus, comprising:
an electromagnetic conversion element rotatably supported on a rotation shaft and provided with an arc-like portion for forming an arc with respect to the rotation shaft;
first positioning means for positioning the electromagnetic conversion element on the magnetic recording and reproducing hard disc by rotating a rotary stage via a pulley contacting the arc-like portion; and
second positioning means for positioning the electromagnetic conversion element on the magnetic recording and reproducing hard disc by slightly moving the pulley in a tangent line direction at a contact point.

16. The hard disc drive apparatus according to claim 15, wherein:
the first positioning step comprises a belt for rotating the rotary stage by the rotation of the pulley, the belt being wound around the arc-like portion and the pulley in an approximately crossing manner in such a manner that the rear surface of the belt runs along the outer circumferential surface of the pulley while the surface of the belt runs along the outer circumferential surface of the arc-like portion.

17. An optomagnetic recording and reproducing drive apparatus, comprising:

an optomagnetic head rotatably supported on a rotation shaft and mounted on a rotary stage provided with an arc-like portion for forming an arc with respect to the rotation shaft;

first positioning means for positioning the optomagnetic head on an optomagnetic recording and reproducing disc by rotating the rotary stage via a pulley contacting the arc-like portion; and second positioning means for positioning the optomagnetic head on the optomagnetic recoding and reproducing disc by slightly moving the pulley in a tangent line direction at a contact point.

* * * * *